United States Patent [19]
Stein et al.

[11] Patent Number: 5,787,798
[45] Date of Patent: Aug. 4, 1998

[54] BUSHING ARRANGEMENT FOR AGITATION SHAFT FOR CORN POPPER BOWL

[75] Inventors: Andrew M. Stein, Floral Park; Andrew Jinks, Amityville, both of N.Y.

[73] Assignee: Six Corners Development Company, Amityville, N.Y.

[21] Appl. No.: 905,898

[22] Filed: Aug. 4, 1997

[51] Int. Cl.[6] ............................................. A23L 1/18
[52] U.S. Cl. ..................... 99/323.9; 99/323.5; 99/348; 366/144; 366/314
[58] Field of Search ......................... 99/348, 323.5, 99/323.6, 323.7, 323.8, 323.9, 323.11; 366/279, 144–146, 314

[56] References Cited

U.S. PATENT DOCUMENTS

| | | | |
|---|---|---|---|
| 1,786,877 | 12/1930 | Thompson | 99/323.9 |
| 2,254,271 | 9/1941 | Cretors | 99/323.9 |
| 2,743,663 | 5/1956 | Bruntjen | 99/323.9 |
| 2,972,292 | 2/1961 | Waas et al. | 99/323.9 |
| 3,812,774 | 5/1974 | Day et al. | 99/323.5 |
| 4,182,229 | 1/1980 | VandeWalker | 99/323.6 |
| 4,850,120 | 7/1989 | Stein | 99/474 X |
| 5,033,363 | 7/1991 | King et al. | 99/323.7 |
| 5,035,173 | 7/1991 | Stein et al. | 99/323.7 |
| 5,505,009 | 4/1996 | Stein et al. | 99/483 X |
| 5,555,792 | 9/1996 | Stein et al. | 99/323.9 |
| 5,694,830 | 12/1997 | Hodgson et al. | 99/323.7 |
| 5,699,720 | 12/1977 | Stein et al. | 99/323.9 |

*Primary Examiner*—Timothy F. Simone
*Attorney, Agent, or Firm*—Pennie & Edmonds LLP

[57] ABSTRACT

A sealed bushing arrangement guides an agitator rotor shaft through an aperture located on the bottom surface of a popping bowl in a popcorn popping assembly. The bushing arrangement has a top portion raised above the bottom surface of the bowl, and may include a cover plate for retaining the seal or seals within the bushing and for securely attaching the bushing to the bottom surface of the popping bowl. The bushing further includes a lower bushing for operative association with the rotor shaft. In the preferred embodiment, a plurality of stacked seals are provided within the bushing to prevent cooking oil from leaking out of the popping bowl along the agitator rotor shaft. The bushing further preferably includes an inner bushing for operative association with the agitator rotor shaft, a middle bushing, and an outer bushing. The inner and outer bushings are comprised of materials which have an expansion rate characteristic lower than that of the rotor shaft. The middle bushing is attached to the inner bushing by an interference fit. Similarly, the outer bushing is attached to the middle bushing by an interference fit. Support braces are provided for securely attaching the bushing arrangement to the bottom surface of the popping bowl.

20 Claims, 3 Drawing Sheets

BUSHING ARRANGEMENT FOR AGITATION SHAFT FOR CORN POPPER BOWL

FIELD OF THE INVENTION

The field of this invention relates to commercial popcorn poppers. More specifically it relates to a reliable, sealed bushing arrangement for guiding an agitator rotor shaft through an aperture in the bottom of a corn popper bowl.

BACKGROUND ART

Tasty and efficient preparation of popcorn requires, as well as the popcorn kernels, high heat and cooking oil. In particular, the cooking oil functions to coat the corn kernels for insuring even distribution of heat throughout the kernel. In order to mix the corn kernels with the cooking oil, and for insuring an even popping of all the corn, an agitator mechanism is generally provided within the popping bowl. The agitator mechanism is rotated by an agitator rotor shaft which is driven by a conventional electric motor.

In base mounted popcorn kettle assemblies, the agitator rotor shaft enters the popping bowl through a centrally located aperture in the bottom of the popping bowl. Unfortunately, in prior art popping assemblies, hot cooking oil may leak out through the aperture of the bowl along the agitator shaft and into the base housing supporting the kettle assembly. This is undesirable as the hot cooking oil may leak into the motor driving the agitator shaft or fall upon other components located within the base housing, and thus create a possible fire hazard.

Solutions have been proposed to resolve this problem. For instance, U.S. Pat. No. 5,555,792 to Stein et al. discloses a bushing for guiding an agitator shaft. The bushing has a top portion raised above the bottom inner surface of the popping bowl to prevent hot cooking oil from leaking out along the agitator shaft. However, there remains a need for an improved sealed bushing arrangement that prevents oil from leaking out along the agitator shaft, while still allowing the agitator rotor shaft to freely rotate within the bushing even during long periods of operation.

SUMMARY

The invention relates to a sealed bushing arrangement which prevents cooking oil from leaking out of a popcorn popping bowl along an agitator shaft and into the base housing of a popcorn popping assembly. The popcorn popping assembly includes a bowl with a centrally located aperture in the bottom of the bowl, and, if desired, a base housing for providing support to the bowl. An agitator mechanism for mixing the corn kernels with the cooking oil and for insuring even popping of all the corn is provided in the bottom of the popping bowl. The agitator mechanism is rotated by an agitator rotor shaft which enters the bowl through the aperture in the bottom of the bowl.

The sealed bushing arrangement of the present invention guides the agitator rotor shaft through the aperture in the bottom of the bowl. Advantageously, the bushing has a top portion raised above the inner bottom surface of the bowl to prevent any cooking oil from exiting the bowl through the aperture. In the preferred embodiment, the sealed bushing arrangement also includes at least one seal member. Generally, a plurality of stacked TEFLON™ seals are used to assure prevention of any cooking oil from leaking out along the agitator rotor shaft.

The bushing arrangement includes a cover plate for retaining the seals within the bushing, and for securing the bushing to the bottom surface of the bowl. A lower bushing for operative association with the rotor shaft is secured to the cover plate. Also provided for operative association with the rotor shaft is an inner bushing which is supported by the seals. In the preferred embodiment, the lower and inner bushings are comprised of bronze which has a lower characteristic thermal expansion rate then the stainless steel of the rotor shaft.

The bushing arrangement further includes a middle bushing which is secured to the inner bushing. In the preferred embodiment, the middle bushing is comprised of stainless steel to give added strength to the bushing arrangement. Moreover, an outer bushing, preferably comprised of bronze, is secured to the middle bushing. The bushing arrangement also includes support braces which secure the bushing to the bottom of the bowl and provide additional retaining support to the lower bushing.

BRIEF DESCRIPTION OF THE DRAWINGS

Additional objects and features of this invention will be apparent from a study of the detailed description and the accompanying drawings wherein.

DETAILED DESCRIPTION OF THE PREFERRED EMBODIMENTS

Figure 1:
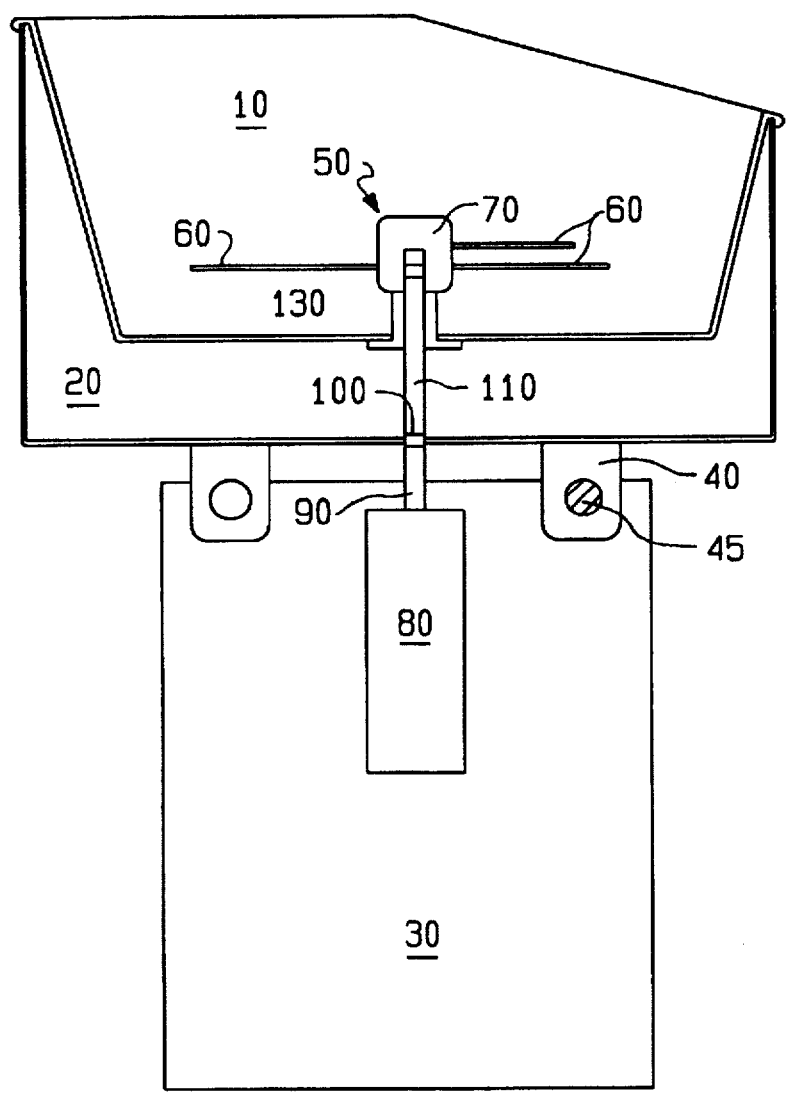
FIG. 1 shows a cross-sectional view of a popcorn popping assembly.

FIG. 1 illustrates a cross-sectional view of a popcorn popping assembly which may utilize the bushing arrangement of the present invention. The popcorn popping assembly of FIG. 1 includes a kettle assembly comprising a bowl 10 for popping the popcorn and a base 20 for mounting the popping bowl. A base housing 30 for supporting the kettle assembly is also shown. Base 20 includes legs 40 which accept pivot axle 45 mounted within the base housing 30. As is well known in the art, the kettle assembly may be rotated about pivot axle 45 from an operable substantially horizontal position as shown, to a substantially vertical emptying position.

When an operator is ready to begin popping, the kettle assembly is pivoted to its operable substantially horizontal position, and corn kernels and cooking oil are provisioned into the bowl 10 for popping. In order to insure that the corn kernels become uniformly coated with the cooking oil during the popping sequence, an agitator mechanism 50 is provided. The agitator mechanism includes rods 60 which are carried by hub 70. A conventional electric motor 80 is mounted in the base housing in order to impart rotational movement to the agitator rotor shaft 110, which in turn rotates agitator mechanism 50. The motor includes motor shaft 90 protruding to junction 100 where the motor shaft junctions with a helical key portion of the agitator rotor shaft 110 in a well known manner when the kettle assembly is in its operable substantially horizontal position. The agitator rotor shaft disengages from the motor shaft 90 when the kettle assembly is pivoted towards its substantially vertical emptying position.

The bushing 130 of the present invention guides the rotor shaft 110 through an aperture in the bottom of the popping bowl 10, wherein the rotor shaft junctions with hub 70 of the agitator mechanism so that the motor may impart rotational movement to the agitator mechanism.

It should be noted that the foregoing is merely illustrative of the type of popping apparatus that may utilize the bushing arrangement of the present invention. For the sake of brevity, elements of a typical popcorn popping assembly that are not critical to the present invention have not been addressed. A more complete description of a base-mounted popcorn popping apparatus is disclosed in U.S. Pat. No. 5,555,792 to Stein et al., the content of which is hereby expressly incorporated by reference.

Figure 2:
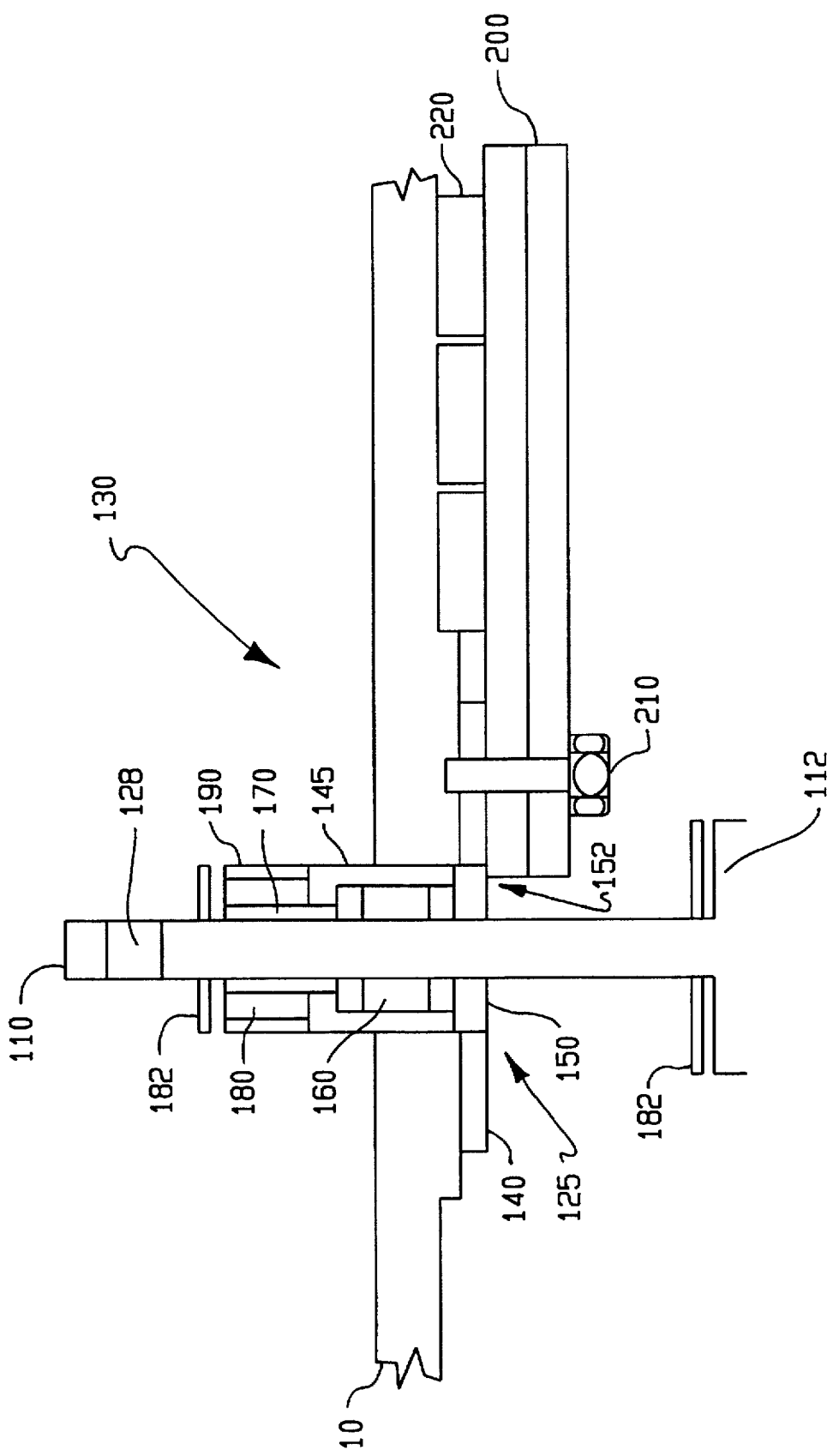
FIG. 2 shows a cross-sectional view of a portion of the bottom of the popping bowl and the bushing arrangement of the present invention.

FIG. 2 illustrates a cross-sectional view of the bottom of the popping bowl, together with the rotor shaft and the bushing arrangement of the present invention. As illustrated, the bowl has a centrally located aperture 125 on its bottom surface for entry of the rotor shaft 110. In the preferred embodiment, the rotor shaft 110 is comprised of hardened stainless steel, and is connected to hub 70 of the agitator mechanism by a thumb screw accepted by a slot 128 in the agitator rotor shaft. The rotor shaft preferably has a helical key portion 112 at its lower end for operative association with the motor shaft 90 when the bowl is in its operative substantially horizontal position. It is understood, however, that other well known coupling configurations may be utilized to couple the rotor shaft to the agitator mechanism and the motor shaft.

Also shown in FIG. 2 is the sealed bushing arrangement of the present invention which is provided for guiding the agitator rotor shaft through the aperture of the popping bowl. This bushing arrangement insures that cooking oil does not leak out of the popping bowl along the agitator rotor shaft and into the base housing.

The sealed bushing arrangement of the present invention includes bushing 130, support braces 200 for providing support to the bushing and for retaining the seals of the bushing, and attaching means such as bolts 210 for attaching the bushing to the bowl. As illustrated in FIG. 2, the bushing 130 advantageously has a top portion raised above the bottom of the bowl to prevent cooking oil from leaking out along the agitator shaft.

The bushing includes a cover plate 140 which is preferably integral to central bushing 145. The cover plate 140 includes slots along its edges which accept bolts 210 such that the bushing arrangement may be securely attached to the bottom portion of the bowl 10. The cover plate also serves to retain the seals within the bushing 130 as further discussed below. In the preferred embodiment, the cover plate includes three slots that are evenly spaced along its circumference for accepting three bolts. Also, in the preferred embodiment, central bushing 145 and cover plate 140 are comprised of stainless steel.

The bushing further comprises a lower bushing 150 having an inner annular surface for operative association with the agitator rotor shaft 110. As shown in FIG. 2, the lower bushing is secured within an inner annular surface of the cover plate 140 by an interference fit. The lower bushing is preferably comprised of bronze, and supports the seals of the bushing.

In the preferred embodiment, a plurality of stacked seals 160 are disposed within the center bushing 145 of bushing 130 for operative association with the agitator rotor shaft 110. These seals are ring-shaped, and are preferably comprised of TEFLON™ or other suitable fluorocarbon polymers or engineered plastics which are heat resistant, relatively flexible, and abrasion resistant. NYLON™ or DELRIN™ plastics can be used in some arrangements. In the preferred embodiment, as shown in FIG. 2, three stacked TEFLON™ seals are provided. Advantageously, the lower seal of these stacked seals has a cupped portion along its upper annular surface for accepting the middle seal in a cupped fashion. Similarly, the middle seal has a cupped portion along its upper annular surface for accepting the upper seal in a cupped fashion. In this manner, the stacked seals are inter-locked.

This cupping configuration also provides for a sealing grip on the agitator shaft, while still allowing the agitator shaft to rotate relatively freely within the bushing. In particular, the inner annular surface of each of the TEFLON™ seals slightly grips the agitator rotor shaft as it rotates. The seals thus prevent cooking oil from leaking out along the agitator shaft and into the base housing. In a less preferred embodiment, a single TEFLON™ or engineered plastic seal may be provided to prevent cooking oil from leaking out along the agitator rotor shaft.

Also shown in FIG. 2 is an inner bushing 170 for operative association with the agitator rotor shaft, a middle bushing 180, and an outer bushing 190. Like the lower bushing, the inner and outer bushings are preferably comprised of bronze, but other materials which have an expansion rate characteristic lower than that of the agitator rotor shaft 110 may be utilized. The middle bushing 180 is attached to the inner bushing 170 by an interference fit. Similarly, the outer bushing 190 is attached to the middle bushing 180 by an interference fit. In the preferred embodiment, the middle bushing is comprised of stainless steel. Such a construction provides increased strength to bushing 130.

As illustrated by FIG. 2, the rotor shaft rotates within the bushing, and is operatively associated with lower bushing 150, the stacked seals 160, and the inner bushing 170. One of the inadequacies of prior art bushing arrangements is that the bushing and agitator rotor shaft are comprised of the same materials, and thus have similar thermal expansion characteristics. Thus, as the temperature rises within the popping bowl, the bushing tends to expand together with the agitator rotor shaft. As a result, friction between the rotating shaft and the bushing increases to a level where the motor driving the rotor shaft tends to lock-up. The bushing of the present invention obviates this problem associated with the prior art.

As discussed above, the inner bushing, the lower bushing, and the stacked seals are comprised of materials having thermal expansion rate characteristics which are lower than that of the stainless steel agitator rotor shaft. Moreover, in the preferred embodiment the inner and lower bushings are comprised of bronze which is oil-impregnated, and thus self-lubricating. Accordingly, the rotor shaft continues to freely rotate within the bushing even after long periods of use.

Also illustrated in FIG. 2 are support braces 200. These support braces serve several functions. First, the support braces slightly overlap a portion 152 of the bottom surface of lower bushing 150 in order to provide additional retaining support for the lower bushing 150, the stacked seals 160, and the inner bushing 170. Further, the support braces have slots which may be threaded to accept attaching means such as a bolt 210 to securely attach the bushing 130 to the bottom of the bowl. As shown in FIG. 2, the support braces may also be extended so as to also provide additional support for the popping bowl heating elements 220 which are otherwise attached to the bottom of the bowl by conventional means.

In the preferred embodiment, each support brace is comprised of two stacked plates which accept a bolt to securely attach the bushing to the bottom surface of the popping bowl. FIG. 2 illustrates a single support brace accepting bolt 210. However, it could be understood that a support brace is provided for each clot of the cover plate 140 accepting a bolt 210.

Also shown in FIG. 2 are washers 182. These washers, preferably comprised of TEFLON™ or another engineered plastic, may be provided along the agitator rotor shaft above and below the bushing arrangement as shown. The upper washer prevents contact between hub 70 (shown in FIG. 1) of the agitator mechanism and the bushing 130. Similarly, the lower washer prevents contact between the KETTLE BASE CASTING and the helical key portion 112 of the rotor shaft.

Figure 3:
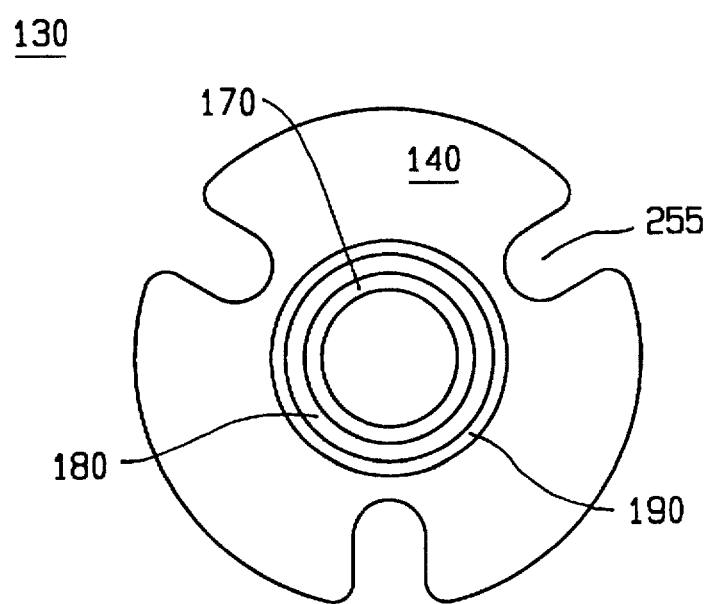
FIG. 3 shows a top view of the bushing of the present invention.

FIG. 3 illustrates a top view of the bushing of the present invention. The cover plate 140 of the bushing 130 is shown with slots 255 for accepting the bolts which securely attach the bushing to the popping bowl. Also illustrated is the inner bushing 170 for operative association with the agitator rotor shaft, and the middle 180 and outer 190 bushings.

The prior detailed description includes preferred embodiments of the apparatus of this invention. Other embodiments will be apparent to one of skill in the art, all of which are equally in the spirit of this disclosure and equally covered by the appended claims.

What is claimed is:

1. A kettle assembly for popping corn comprising:
   a bowl including a bottom portion, the bottom portion having an aperture;
   an agitator mechanism configured and positioned for agitating corn in the bowl;
   an agitator rotor shaft operatively associated with the agitator mechanism; and
   a bushing arrangement secured to the bottom of the bowl, wherein the bushing arrangement guides the agitator rotor shaft through the aperture, and wherein the bushing arrangement comprises:
      a cover plate secured to the bottom of the bowl; and
      at least one seal member disposed within the bushing arrangement for operative association with said agitator rotor shaft, said seal member preventing cooking oil from leaking out along the agitator rotor shaft of the popcorn kettle assembly.

2. The kettle assembly of claim 1, wherein the at least one seal member comprises a plurality of stacked seals, at least one of which is comprising an engineered plastic that is heat resistant, relatively flexible and abrasion resistant.

3. The kettle assembly of claim 2, wherein the bushing arrangement further comprises a lower bushing secured to the cover plate for operative association with the agitator rotor shaft, and wherein the plurality of stacked seals are supported by the lower bushing.

4. The kettle assembly of claim 3, wherein the bushing arrangement further comprises an inner bushing operatively associated with the agitator rotor shaft, and wherein the inner bushing is supported by the plurality of stacked seals.

5. The kettle assembly of claim 1, wherein the cover plate includes slots, and wherein the bushing arrangement is secured to the bowl by attaching means accepted by the slots of the cover plate.

6. The kettle assembly of claim 4, wherein the bushing arrangement further comprises a middle bushing secured to the inner bushing.

7. The kettle assembly of claim 5, wherein the bushing arrangement further comprises support braces, and wherein the bushing arrangement is secured to the bowl by the attaching means accepted by the support braces and the slots of the cover plate.

8. The kettle assembly of claim 7, wherein the bushing arrangement further comprises a lower bushing secured to the cover plate for operative association with the rotor shaft, and wherein the support braces provide support to the lower bushing by overlapping a portion of a bottom surface of the lower bushing.

9. The kettle assembly of claim 1, wherein the bowl is operatively associated with a base housing such that the bowl is pivotable about a pivot axle mounted within the base housing from an operable substantially horizontal position to an emptying substantially vertical position, said agitator rotor shaft secured to the agitator mechanism such that the agitator rotor shaft disengages from a motor shaft when said bowl is pivoted towards said emptying substantially vertical position.

10. A kettle assembly for popping corn comprising:
   a bowl including a bottom portion, the bottom portion having an aperture;
   a base housing for supporting the bowl;
   an agitator mechanism configured and positioned for agitating corn in the bowl;
   an agitator rotor shaft comprised of a first material and operatively associated with the agitator mechanism; and
   a bushing secured to the bottom of the bowl, wherein the bushing guides the agitator rotor shaft through the aperture, and wherein the bushing comprises:
      at least one seal member secured within the bushing for operative association with the agitator rotor shaft; and
      an inner bushing comprised of a second material secured within the bushing for operative association with the agitator rotor shaft; and wherein the first and second materials have different thermal expansion characteristics thereby preventing the bushing from expanding and constricting the relatively free rotational movement of the agitator shaft.

11. The kettle assembly of claim 10, wherein the at least one seal member is comprised of an engineered plastic that is heat resistant, relatively flexible and abrasion resistant.

12. The kettle assembly of claim 10, wherein the at least one seal member comprises a plurality of stacked seals.

13. The kettle assembly of claim 10, wherein the bushing further comprises a middle bushing comprised of the first material, and wherein the middle bushing is secured to the inner bushing.

14. The kettle assembly of claim 13, wherein the bushing further comprises an outer bushing comprised of the second material, and wherein the outer bushing is secured to the middle bushing.

15. The kettle assembly of claim 10, wherein the first material is stainless steel and the second material is bronze.

16. The kettle assembly of claim 10, wherein the bowl is operatively associated with the base housing such that the bowl is pivotable about a pivot axle mounted within the base housing from an operable substantially horizontal position to an emptying substantially vertical position, said agitator rotor shaft secured to the agitator mechanism such that the agitator rotor shaft disengages from a motor shaft when said bowl is pivoted towards said emptying substantially vertical position.

17. A kettle assembly for popping corn comprising:
   a bowl including a bottom portion, the bottom portion having an aperture;

a base housing for supporting the bowl;

an agitator mechanism configured and positioned for agitating corn in the bowl;

an agitator rotor shaft operatively associated with the agitator mechanism; and a bushing arrangement secured to the bottom of the bowl, wherein the bushing arrangement guides the agitator rotor shaft through the aperture, and wherein the bushing arrangement comprises at least one seal member secured within the bushing for operative association with the agitator rotor shaft, said at least one seal preventing cooking oil from leaking out along the agitator rotor shaft of the popcorn kettle assembly.

18. The kettle assembly of claim 17, wherein the at least one seal member is comprised of an engineered plastic that is heat resistant, relatively flexible and abrasion resistant.

19. The kettle assembly of claim 17, wherein the bushing has a top portion which is raised above the inner bottom surface of the bowl which prevents oil from leaking out of the bowl through the aperture.

20. The kettle assembly of claim 17, wherein the bowl is operatively associated with the base housing such that the bowl is pivotable about a pivot axle mounted within the base housing from an operable substantially horizontal position to an emptying substantially vertical position, said agitator rotor shaft secured to the agitator mechanism such that the agitator rotor shaft disengages from a motor shaft when said bowl is pivoted towards said emptying substantially vertical position.

* * * * *